Dec. 17, 1968      R. D. FREIBERGER      3,416,408
VACUUM CONTROL SYSTEM WITH REGULATING RELAY VALVE
Filed May 4, 1967
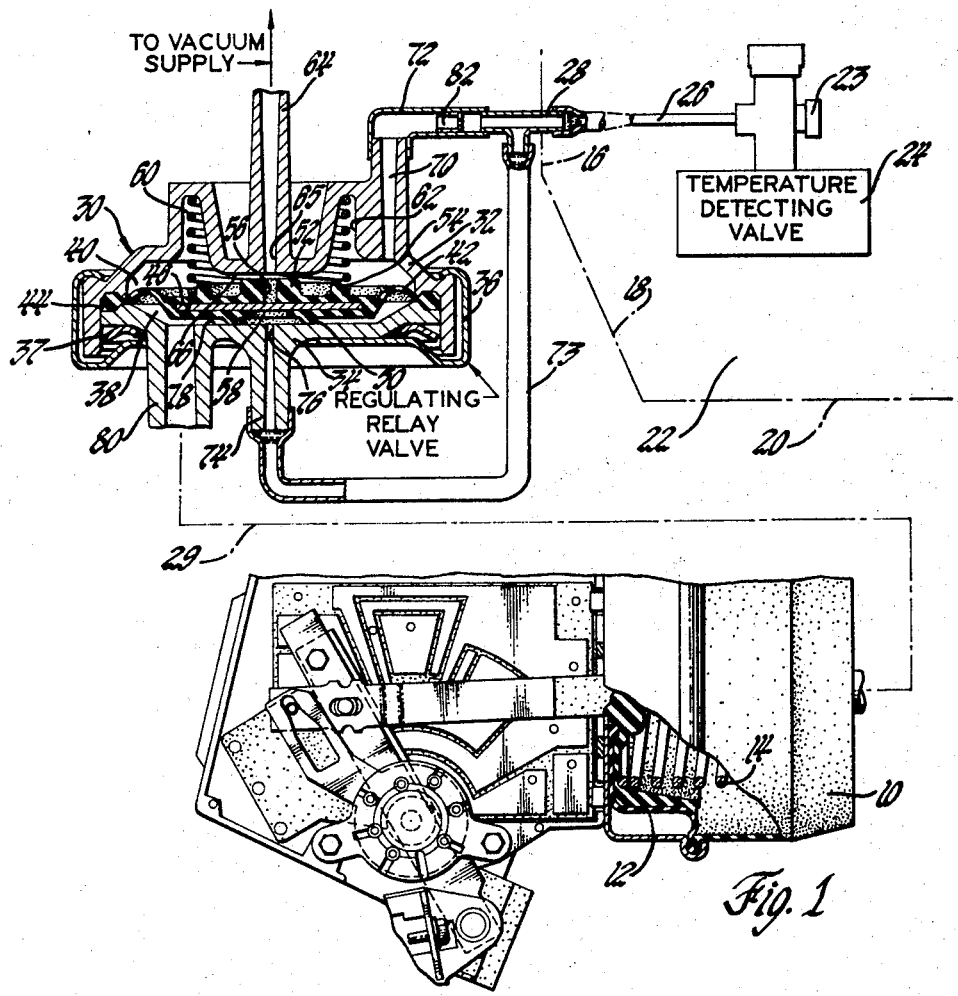
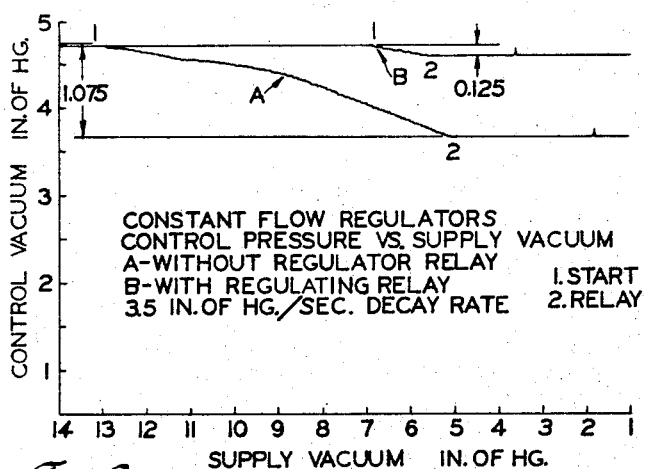
INVENTOR.
Ronald D. Freiberger
BY
George E. Johnson
ATTORNEY

United States Patent Office 3,416,408
Patented Dec. 17, 1968

3,416,408
VACUUM CONTROL SYSTEM WITH REGULATING RELAY VALVE
Ronald D. Freiberger, Kokomo, Ind., assignor to General Motors Corporation, Detroit, Mich., a corporation of Delaware
Filed May 4, 1967, Ser. No. 636,212
5 Claims. (Cl. 91—419)

ABSTRACT OF THE DISCLOSURE

A vacuum control system using a control slave member moved in accordance with the extent of a vacuum in turn modulated in accordance with a condition variation encountered, the supply of crude vacuum being regulated to cause desired modulation of the controlled vacuum and consequent action of the slave member more effectively to compensate for the variation.

---

This invention relates to control systems and more particularly to vacuum control systems such as employed with automobile passenger compartment heating and/or air conditioning systems in each of which one and usually more changes in conditions encountered must be compensated for to attain a desired condition such as a given or preselected temperature in a passenger compartment.

A system in this general field is disclosed in the United State Patent 3,263,739 granted Aug. 2, 1966, in the names of G. M. Gaskill, W. H. Kolbe, T. A. Prewitt and E. W. Yott. This patented system operates very satisfactorily but the use of electronic devices and a transducer in obtaining the modulated vacuum to operate a control motor or slave member sometimes gives rise to a servicing problem. The slave member positions a proportioning or air mixing damper to correct for a change in temperature or other aspect commonly encountered in automobile usage.

It has been found that a bimetal control of simple form can be substituted for the electronic control to gain a desired modulated vacuum for operating the slave member or motor satisfactorily under most conditions. It has also now been found, however, that crude vacuum, as supplied from an engine intake manifold is highly variable and to such an extent that not only should the vacuum control system be shut off from the crude vacuum supply when that supply falls below a given minimum but the flow of crude vacuum should be regulated to give a relatively constant flow rate when the control system is fully operative.

An object of the present invention is to provide an improved vacuum control system in which a controlled or modulated vacuum is derived from a regulated crude vacuum supply to gain a desired action of a slave member as a more accurate response to or compensation for a change in a condition such as temperature.

A feature of the present invention is a regulating relay valve and a temperature detecting and vent valve arranged in a vacuum line between a source of crude vacuum such as an engine intake manifold and a slave member such as a vacuum motor for positioning an air mixing damper.

The above and other features of the invention will now be described in detail and then pointed out more particularly in the appended claims.

In the drawings:

FIGURE 1 shows a diagrammatic view of the components of a system employing this invention with one of those components positioned in a passenger compartment and vacuum lines connecting the components; and FIGURE 2 shows comparative curves idicating improvement in control performance when a regulating relay valve is added to constitute the system shown in FIGURE 1.

In FIGURE 1, a vacuum motor or slave member 10 is depicted. It is essentially the same as disclosed in the Patent 3,263,739 above referred to in that a modulated or controlled vacuum moves a diaphragm 12 against the force of a spring 14 an amount in accordance with the degree of modulated vacuum applied and therefore varies the positioning of a damper and other elements (not shown) ultimately to compensate for temperature variation in a passenger compartment.

A firewall 16, toe-board 18 and floor 20 at the front of an automobile are shown in dot and dash lines to indicate a zone 22 of a passenger compartment in which a temperature detecting and vent valve 24 is installed. This valve may take a number of forms but could be a valve such as disclosed in the United States patents to Boyd 2,194,274 or Houser 3,221,991 suitably modified for given situations. It is sufficient here to say that the valve 24 utilizes a bimetal to detect the temperature in the zone 22 and will accordingly admit a controlled amount of air through a filter 23 thereby to modulate the degree or extent of vacuum in a line 26 connecting the valve 24 to a T connecting 28. Details regarding the valve 24 are not described herein as they form no part of the present invention.

The regulating relay valve 30 is shown in section and it includes two body halves 32 and 34 held together by a clamping ring 36 aided by a spring washer 37 to define a controlled or modulated vacuum chamber 38 and a regulated vacuum chamber 40 separated by a flexible diaphragm 42. The latter has an integral annular rim 44 tightly clamped between the halves 32 and 34. A stiffener plate 46 is embedded in a central portion of the diaphragm 42 so that flexibility of the diaphragm is confined to an annular curved portion of the latter. One side of the diaphragm has a small annular ridge 50 integral therewith. The other side has a central hub portion 52 and a coaxial ridge 54. Recesses 56 and 58 in the opposite sides of the diaphragm 42 have no significance in valve operation but are helpful in making the diaphragm. The ridge 54 serves to centralize a coil spring 60 retained in an annular recess 62 of the halve 32. A central tube 64 is provided to lead to a crude vacuum supply such as an engine intake manifold. This tube terminates with an orifice 65 at a flat surface 66 within the valve and facing the hub portion 52. A passage 70 is formed in the halve 32 to lead from the chamber 40 and this passage is connected by a line 72 to one leg of the T connection 28. A line 73 connects the third leg of the T connection 28 to a nipple 74 of the halve 34 leading to a flow orifice 76 in a surface 78 facing the annular ridge 50. A second nipple 80 on the halve 34 enables the modulated vacuum chamber 38 to be connected to the slave motor 10 by ways of a line 29. A master orifice 82 is placed in the line 72.

If the novel aspect of the present invention were not used, the regulating relay valve 30 would be omitted. In such a case, crude vacuum from the engine intake manifold would be led directly from the supply 64 to the valve 24 and line 73 would lead directly from the T connection 28 to the motor 10. In operation, the supply vacuum (supply 64 direct from engine) plotted against the control vacuum (line 73 direct to motor 10) would yield the curve A of FIGURE 2. The rate of change of supply vacuum represents a normal acceleration or hill climp of an automobile while the system being controlled is operating in the air conditioning mode. The system friction (hysteresis) tends to "mask out" variations of control vacuum under 0.25 inch of mercury. As FIGURE 2 shows, without the regulator relay valve 30 function, the performances of the control system allows a drop of 25 percent of the control range during the car acceleration or hill climp. Points 1 on the chart show the beginning of the control degradation with and without the relay valve 30.

Points 2 on the chart show the end or "lockout" of the control range with and without the relay valve 30.

With the use of the present invention and the relay valve 30 installed as shown in FIGURE 1, vacuum is metered by the master orifice 82 to gain a relatively constant flow rate, i.e., to maintain a given vacuum over a range of flow. FIGURE 2 shows a test result giving a variation of 1.075 inches of mercury over an input vacuum range of 8 inches of mercury. This variation occurs because the flow through the orifice 82 varies with the supply vacuum at 64. The inflow of air to the system is throttled by the temperature detecting valve 24 and the regulated vacuum of chamber 40 is modulated by the valve 30 properly to operate the slave motor 10 in accordance with a temperature variation in the passenger compartment or zone 22. The pressure drop across the diaphragm 42 is a constant determined by the spring 60. The pressure drop across the orifice 82 being a constant, the flow in line 29 is therefore a constant although varying perhaps slightly with conditions of altitude, density, humidity and temperature. If the crude vacuum supply in tube 64 becomes too low, the ridge 50 will seat on the surface 78 and hold the already attained position of the diaphragm 12 in the motor 10. Such holding will obtain until adequate operational crude vacuum is reestablished. When such vacuum is existent the regulating valve 30 gives rise to a performance illustrated by the curve B in the chart of FIGURE 2. That curve shows a very small deviation of the control vacuum operating the slave motor 10.

I claim:

1. A vacuum control system for compensating for a variation in a condition such as temperature, said system including a source of crude vacuum, a vacuum regulating relay valve, a condition variation detecting valve, and a slave motor, said relay valve defining a regulated crude vacuum chamber and a controlled vacuum chamber and including a pressure actuated diaphragm separating the said two chambers, said condition variation detecting valve having an air admission port, a connection from said crude vacuum source including a first orifice in said relay valve leading to said regulated crude vacuum chamber, a spring in the latter chamber urging said diaphragm to open said first orifice, connections from said regulated crude vacuum chamber to said condition variation detecting valve and to said controlled vacuum chamber, a second orifice in said relay valve leading to said controlled vacuum chamber, said second orifice being positioned to be closable by said diaphragm in opening said first named orifice, a connection from said controlled vacuum chamber to said slave motor, and the arrangement being such that said spring is adapted to close said second orifice when said crude vacuum supply is inadequate and vacuum in said controlled vacuum chamber is modulated in accordance with the operation of the condition variation detecting valve when said crude vacuum supply is adequate.

2. A vacuum control system for compensating for a temperature variation, said system including a source of crude vacuum, a vacuum regulating relay valve, a temperature variation detecting valve, and a slave motor arranged to operate in accordance with said variation, said relay valve including a diaphragm separating a regulated crude vacuum chamber connected to said source from a controlled vacuum chamber connected to said slave motor and spring means acting against said diaphragm, said temperature variation detecting valve including an air admission port, and means connecting each of said chambers to said temperature variation detecting valve aided by said spring means to gain a controlled flow rate and also a substantially constant pressure drop across said diaphragm.

3. A vacuum control system as set forth in claim 2, said connecting means including a master orifice.

4. A vacuum control system as set forth in claim 2, said connecting means including a T connection, one leg of the latter being connected through a master orifice to said regulated crude vacuum chamber, a second leg being connected to said temperature variation detecting valve, and a third leg being connected to said controlled vacuum chamber.

5. A vacuum control system as set forth in claim 2, said air admission port being in communication with an automobile passenger compartment.

References Cited

UNITED STATES PATENTS 2,811,314  10/1957  Lund _____ 137—85

PAUL E. MASLOUSKY, *Primary Examiner.*

U.S. Cl. X.R.

91—447; 137—82; 236—82; 92—94